(12) United States Patent
Shimizu et al.

(10) Patent No.: US 6,898,004 B2
(45) Date of Patent: May 24, 2005

(54) MICROSCOPE SYSTEM

(75) Inventors: Keiji Shimizu, Fussa (JP); Shuzo Mishima, Hachioji (JP); Yoshihiro Kawano, Hicksville, NY (US)

(73) Assignee: Olympus Optical Co., Ltd., Tokyo (JP)

( * ) Notice: Subject to any disclaimer, the term of this patent is extended or adjusted under 35 U.S.C. 154(b) by 120 days.

(21) Appl. No.: 10/252,434

(22) Filed: Sep. 23, 2002

(65) Prior Publication Data

US 2003/0063376 A1 Apr. 3, 2003

(30) Foreign Application Priority Data

Sep. 28, 2001 (JP) ........................................ 2001-304123

(51) Int. Cl.⁷ ............................................. G02B 21/06
(52) U.S. Cl. ....................................... 359/385; 359/388
(58) Field of Search .................................. 359/385, 388

(56) References Cited

U.S. PATENT DOCUMENTS 5,061,049 A   10/1991  Hornbeck
5,923,466 A    7/1999  Krause et al.
6,128,077 A   10/2000  Jovin et al.

FOREIGN PATENT DOCUMENTS

JP          7-134250 A    5/1995
JP       2000-502472 A    2/2000

*Primary Examiner*—Thong Nguyen
*Assistant Examiner*—Mark Consilvio
(74) *Attorney, Agent, or Firm*—Frishauf, Holtz, Goodman & Chick, P.C.

(57) ABSTRACT

In a microscope system, illumination light rays are emitted from a light source. The illumination light rays are collimated and reflected from a mirror to the optical element array. The optical element array is located at a conjugate position of a specimen, and includes a plurality of micro mirrors arranged in a matrix form. The micro mirrors are individually controlled to selectively reflect the illumination light rays for illuminating the specimen. Thus, a predetermined pattern of the light rays is reflected from the optical element array to an objective lens. The illumination light rays are projected on the specimen from the objective lens and the specimen is illuminated by the predetermined illumination pattern.

4 Claims, 7 Drawing Sheets

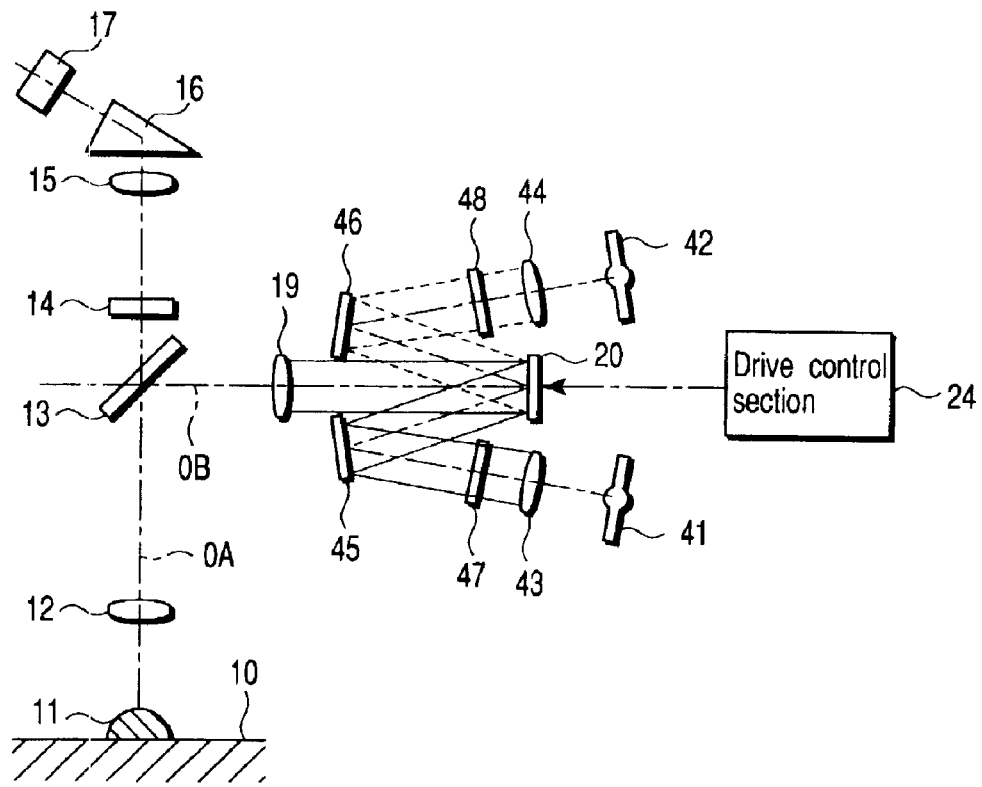
F I G. 5
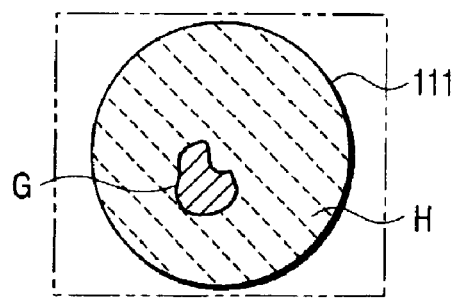
F I G. 6

MICROSCOPE SYSTEM

CROSS-REFERENCE TO RELATED APPLICATIONS

This application is based upon and claims the benefit of priority from the prior Japanese Patent Application No. 2001-304123, filed Sep. 28, 2001, the entire contents of which are incorporated herein by reference.

BACKGROUND OF THE INVENTION

1. Field of the Invention

The present invention relates to a microscope system, and more particularly to a microscope system such as a fluorescence microscope system provided with an illumination mechanism for illuminating a specimen.

2. Description of the Related Art

Generally, a microscope system of a Kohler illumination type is provided with a field stop function of illuminating a region to be observed on a specimen, the illuminated region being the same as the observation region. In this microscope system, a field stop is so adjusted as to illuminate the necessary part of the specimen in a field at a time of fluorescence observation and the necessary part of the specimen is observed. Thus, the other part of the specimen can be prevented from being deteriorated and bleaching out, due to the illumination of fluorescence light.

In addition, an observation method such as FRAP (Fluorescence Recovery After Photo-bleaching) or FLIP (Fluorescence Loss In Photo-bleaching) is proposed, in which a specimen is partly bleached out and a recovery of the bleached portion of the specimen is observed in an observation field with use of a fluorescence observation so that a substance transfer in a cell can be observed. An another observation method is also proposed, in which illumination light rays, i.e., UV light rays are partly applied to a specimen dyed with a caged chemical reagent in which a chemical activities are confined, a characteristic in the part of the specimen is recovered, and a diffusion of the specimen part is observed. In these methods, it is required for the fluorescence observation that an illumination spots or spot on the specimen, in the observation field, are adjustable in size and shape.

In the method of illuminating a part of the specimen in the observation field, a pinhole or a slit are removably arranged at the position of the field stop, which corresponds to the conjugate position in respect of the specimen, so as to realize a partial illumination.

An iris stop is generally used as the field stop, which is provided with a variable aperture having a diameter mechanically and automatically adjusted. This optical arrangement is disclosed in Laid-open Japanese Patents 7-134250 and 2000-502472, in which a liquid crystal device (LCD) of a transmission type is arranged at the position of the field stop and its transparent area is controlled as the variable field stop. According to this arrangement, it is possible to match an illumination region with an observation region, and also illuminate a part in an observation field with a spot of arbitrary size and shape.

However, in this arrangement using the liquid crystal stop, there are problems that the transmission factor of the liquid crystal stop is low even in a state of 100% transmission illumination control, the illumination light level cannot be sufficiently increased, and the color balance of the light rays transmitted through the liquid crystal stop is changed. Thus, the observation precision is lowered. Furthermore, in the case of using UV light rays for fluorescence illumination, it is difficult to prepare a liquid crystal stop having a high UV transmission factor and fluorescence light of low self-emission characteristic.

In addition, the liquid crystal stop has a control response speed, which is as slow as tens of milliseconds. Therefore, if changes in a cell are observed, in relation to an elapse of the time, while changing an illumination position and shape in the observation field, it is difficult to achieve highly precise observation due to such a slow response speed.

In Laid-Open Japanese Patent 2000-502472, a digital mirror device (DMD) is disclosed, which is used instead of a LCD and has a light modulation structure instead of a LCD. However, in the description of the embodiment of this disclosure, there is no concrete description of an arrangement constituting an illumination device with using a DMD.

As described above, the conventional microscope system provided with the liquid crystal stop cannot achieve a sufficient observation precision, because the liquid crystal stop has a low transmission factor, the color balance of transmitted light rays varies, and a response characteristic of a control system is bad.

BRIEF SUMMARY OF THE INVENTION

According to the invention, there is provided a microscope system for observing a specimen, comprising:

an objective lens having an optical axis and facing to the specimen;

illuminating unit configured to emitting illumination light rays;

optical element array including a plurality of micro deflection elements, each configured to deflect the illumination light rays emitted from the illumination unit and selectively direct the illumination light rays in one of first and second directions, the optical element array being arranged on the optical axis and located at a conjugate position in respect to the specimen; and control section configured to control the deflecting elements, individually, to form a predetermined pattern of the illumination light rays directed to the first direction,; and transfer optical system configured to transfer the predetermine pattern of illumination light rays to the specimen.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 schematically shows a microscope system according to a third embodiment of this invention.

FIG. 6 shows a plane view schematically illustrating an image observed by a microscope system shown in FIG. 1.

DETAILED DESCRIPTION OF THE INVENTION

A microscope system according to embodiments of the invention will be described with reference to the drawings.

Figure 1:
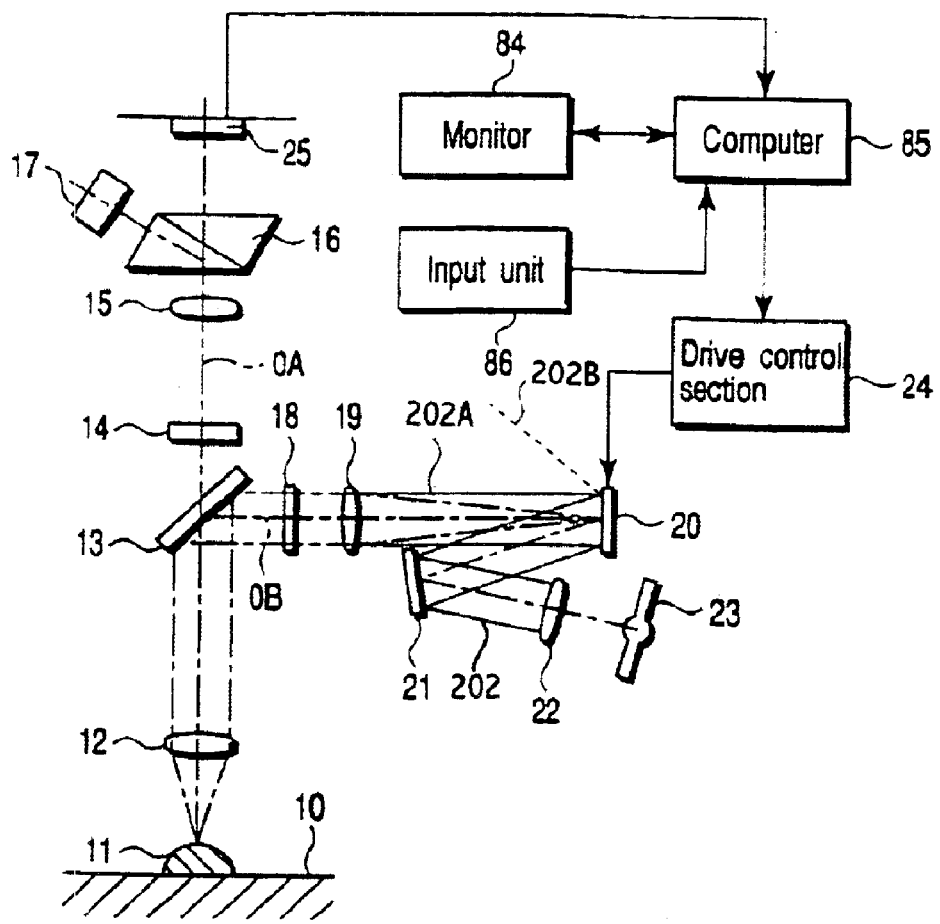
FIG. 1 schematically shows a microscope system according to one embodiment of this invention.

FIG. 1 schematically shows a microscope system according to one embodiment of this invention. As shown in FIG. 1, a microscope system is provided with a stage 10 on which a specimen 11 is mounted. An objective lens 12 is so located above the stage 10 as to face the specimen 11. A dichroic mirror 13, an absorption filter 14, an image forming lens 15, and a half prism 16 are arranged on an optical axis OA of the objective lens 12. In stead of the half prism 16, a reflection prism having a reflection of 100%, a transmission prism having a transmittance 100%, and a switching mechanism for switching to the transmission prism from the reflection prism and to the reflection prism from the transmission prism and selectively arranging one of the reflection prism and the transmission prism on the optical axis. An eyepiece lens 17 and CCD image sensor 25 are also arranged on a reflection optical axis and a transmission axis extending from the half prism 16. An excitation filter 18 such as a band pass filter, a field stop and projection lens system 19, and a digital micro-mirror device (DMD) 20 are arranged on an illumination optical axis OB between the digital micro-mirror device 20 and the dichroic mirror 13. A light source 23 such as a mercury lamp or a laser unit is located at an incident side of digital micro-mirror device 20, and a reflection mirror 21 and a collector lens 22 are arranged between the digital micro-mirror device 20 and the light source 23.

Image data obtained in the CCD image sensor 25 is supplied to a computer 85 and an image of the specimen 11 is displayed 84 on a monitor in response to an instruction supplied from an input section 86. The computer 85 controls a drive control section 24 in response to an instruction supplied from the input section 86 and the DMD 20 is controlled by the control drive section 24, as describe later.

The DMD 20 is known as described in a publication such as U.S. Pat. No. 5,061,049, and has a configuration shown in FIG. 2. The DMD 20 includes micro-mirrors 201 which are substantially arranged in a two dimensional matrix array and can be individually voltage-controlled. Each of the micro-mirrors 201 can be electro-statically tilted and each inclination angle of the micro-mirrors 201 can be changed depending on the on-off control voltage.

This DMD micro mirror array is so located as to be perpendicular to the illumination optical axis OB, and is arranged at a conjugate position of the specimen 11 relative to the lens system between the DMD 20 and the specimen 11. The micro mirrors 201 of the DMD 20 are selectively on-off-controlled in response to on-off drive control signals supplied from the drive control section 24, at a response speed in the order of ten microsecond.

Figure 2:
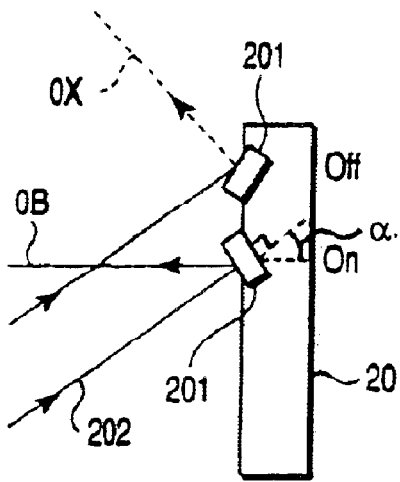
FIG. 2 is a side view schematically showing a digital minute mirror device in the microscope system shown in FIG. 1.

In an example of a DMD 20, 1024×768 micro mirrors 201 are arranged in rows and columns to constitute an array. In FIG. 2, only two micro mirrors are shown for simplifying the drawing and an explanation. Each of the micro mirrors is slanted toward a predetermined angle of inclination α, for example, 10°, relative to the perpendicular line and has a predetermined shape and area, for example, a pyramid roof shape and area less than or equal to 20×20 $\mu m^2$. If the micro mirrors 201 are controlled to be in the on-state, the micro mirrors reflect and guide the illumination light rays from the light source 23 to the optical system 19 along the illumination optical axis OB, and if the micro mirrors 201 are controlled to be in the off-state, the micro mirrors reflect and guide the illumination light rays from the light source 23 to the outside of the optical system 19 along an evacuation optical axis OX. The drive control signals are supplied to the micro mirrors 201, respectively, and the micro mirrors 201 are individually controlled in the DMD 20. Thus, the drive control circuit 24 selects the micro mirrors 201, and maintains the selected micro mirrors 201 in the on state and the other of the micro mirrors 201 in the off state, so that only the illumination light rays guided from the micro mirrors 201 are directed to the optical system 19 and a predetermined pattern of the illumination light rays is transferred to the optical system 19 from the DMD 20.

In the system shown in FIG. 2, the field stop and projection lens system is so located on the illumination optical axis OB as to align its front and rear focal points at the pupils of object lens 12 and the surfaces of the micro mirrors 201. That is, the field stop and projection lens system 19 includes one or more lenses which have a focal length f1 within a range of 50 mm to 300 mm to project images of the micro mirrors 201 on the specimen 11 at a proper magnification. The range of the focal length f1 is determined based on the following. If the focal length f1 is smaller than 50 mm, it is difficult to realize an optical system of the microscope system. If the focal length is larger than 300 mm, the image or images of the micro mirror or mirrors is formed at a relatively small magnification, thus a preferable visual field cannot be obtained and the illumination is also lowered in the field of view. In this embodiment of the microscope system, the focal length f1 is preferably 170 mm.

In addition, if the digital micro-mirror device (DMD) 20 has the following relation in respect to the size of the CCD image sensor 25 for photographing the observation image of the specimen 11, it is easy to design the microscope system and arrange the components of the DMD 20, $$0.3 < f2/f1 < 5$$

$$0.3 < C/D < 6.6$$

wherein f2 is the focal length of the imaging lens 15, C is the diagonal length or size of the CCD image sensor, and D is the diagonal length or size of the DMD 20, i.e., the array of the micro mirrors 201. In this embodiment, the focal distance f2 is selected from a range between the 100 m and 200 mm, and is preferably 180 mm.

In the optical system shown in FIG. 1, the illumination light rays 202 are emitted from the light source 23, collimated by the collection lens 22, and reflected from the mirror 21 to the DMD 20. The illumination light rays 202 guided to the DMD 20 are incident on the micro mirrors 201, part or parts 202A of the illumination light rays 202 incident on the micro mirror or mirrors maintained in the on state are reflected to the projection lens system 19, along the illumination optical axis OB, as shown in FIG. 2. The other parts 202B of the illumination light rays incident on the micro mirrors which are in the off state are reflected to the outside of the system along the evacuation optical axis OX and are not used to illuminate the specimen 11.

The illumination light rays 202A guided to the field stop and projection lens system 19 are directed to the excitation filter 18, and excitation components of the light rays 202A, which excite fluorescent substances in the specimen 11, are permitted to pass through the excitation filter 18 in the excitation filter 18, and the light rays of the excitation components are guided to the dichroic mirror 13. The excitation light rays 202A are reflected from the dichroic mirror 13 to the objective lens 12, and are converged and projected on the specimen 11 from the objective lens 12. Thus, the specimen emits fluorescence light rays due to the illumination of the excitation light rays 202A.

The fluorescence light rays emitted from specimen 11 are directed to the objective lens 12 and converged by the objective lens 12. The fluorescence light rays emerged from the objective lens 12 are transferred to dichroic mirror 13 and pass through the dichroic mirror 13. The light rays passing through the dichroic mirror 13 are filtered by the absorption filter 14, and a predetermine fluorescence component of the light rays selectively passes through the absorption filter 14 and is incident on the imaging lens 15. The fluorescence light rays are transferred to the half prism 16 and are split into tow bundles of light rays which are directed to the CCD image sensor 25 and the eye piece lens 17. The imaging lens 15 forms an image of the specimen 11 on the CCD image sensor 25 and at an imaging plane between the eye piece lens 17 and the imaging lens 15, respectively. The image of the specimen is enlarged and observed by the eyepiece lens 17.

In the optical system shown in FIG. 1, images of the micro mirrors 201, i.e., DMD image are transferred from the DMD 20 to the specimen 11 and formed on a focus plane on the specimen 11 by the field stop and projection lens 19 and the objective lens 12. The mirror images corresponding to the micro mirrors which are controlled and maintained in the on state are formed as bright images, because the illumination light rays reflected from the on-state micro mirrors are guided to the specimen and forms illuminated mirror images. The mirror images corresponding to the micro mirrors which are controlled and maintained in the off state are formed as dark images, because the illumination light rays reflected from the off-state micro mirrors are not guided to the specimen and form non-illuminated mirror images. That is, the micro mirror images in the DMD image are projected as bright and dark images on the specimen 11 depending on the on and off-controlled states. Thus, the specimen 11 can be controllably illuminated by the bright images and partial areas on the specimen can be selectively illuminated depending on the on-off control of the micro mirrors 201.

A procedure of designating region or regions on the specimen and illuminating the designated region or regions in the optical system shown in FIG. 1 will be described with reference to FIG. 3A to FIG. 3C. There are two types of designating a region or region. In the first type of designating the region, the region, for example, a field of view is predetermined, and in a second type, a microscope operator determined and designated an arbitrary region or regions to be interested in the field of view.

Figure 3A:
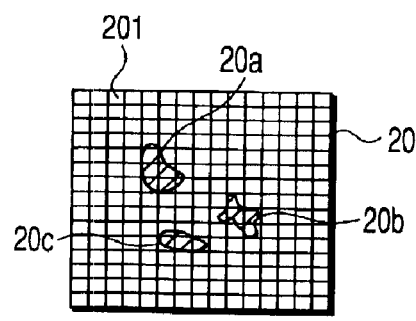
FIGS. 3A and 3C show plane views schematically illustrating a reflecting surface of a DMD and a positional relation between the reflecting surface of a DMD and images observed by the microscope system shown in FIG. 1.

FIG. 3A shows a reflection surface of the DMD 20 and the micro mirrors 201 are arranged in the reflection surface of in a pattern of a matrix form. FIG. 3B shows a focusing plane on the specimen 11. In FIG. 3B, numeral 113 shows a range on an image of specimen 11, which is acquired by CCD sensor 25. In FIG. 3B, numeral 112 denotes a projection image of the reflection surface of the DMD 20, numeral 111 denotes an observation visual field of the eyepiece lens 111, and numerals 11a, 11b, 11c denotes regions where a microscope operator is interested in on specimen 11. Regions 20a, 20b, 20c are shown in FIG. 3A, which corresponds to the regions 11a, 11b, 11c. FIG. 3C shows three groups 201a, 201b, 201c of the micro mirrors 201 which are maintained in on-state depending on the designations of the regions 20a, 20b, 20c.

First, there will be described the designating procedure in which a microscope operator determines and designates an arbitrary region or regions of interest in the field of view.

Figure 3B:
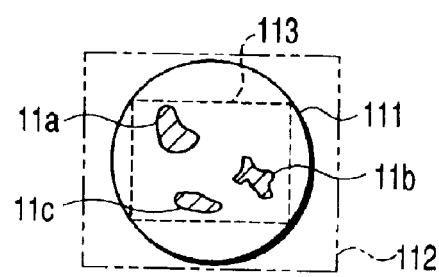
FIG. 3B shows a plane view schematically illustrating images observed by the microscope system shown in FIG. 1.

At first in this procedure, images of the interest regions 11a, 11b, 11c in the specimen 11 are formed on the CCD sensor 25 as shown in FIG. 3B, in accordance with an observation method for determining the interest regions in the specimen 11, for example, a fluorescence observation and a phase difference observation. Image data of the interest regions 11a, 11b, 11c is transferred to the computer 85, and the image is displayed on monitor 84 on the basis of the image data. The image on this monitor 84 is checked by a microscope operator, the regions 11a, 11b, 11c are specified in the image by utilizing the input unit 86, and the micro mirrors 201 corresponding to the specified regions 11a, 11b, 11c are specified by means of the computer 85. The groups 201a, 201b, 201c, as shown in FIG. 3C, of the micro mirrors 201 which are controlled to be in the on-state to reflect the illumination light rays to the interest regions 11a, 11b, 11c are determined based on the region 20a, 20b, 20c on DMD 20, shown in FIG. 3A, which corresponds to the interest regions 11a, 11b, 11c. The interest regions 11a, 11b, 11c can be specified in the screen of the monitor by utilizing a pointing device or an another device or method for pointing the images so that the micro mirror groups 201a, 201b, 201c corresponding to the region 11a, 11b, 11c can be determined by the computer 85. The mirror control data for specifying the micro mirror groups 201a, 201b, 201c are saved to a memory of computer 85.

Figure 3C:
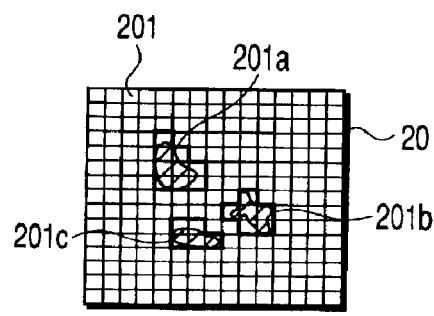

When the illumination of the interest regions 11a, 11b, 11c are started, the mirror control data stored on the memory are read by the computer, and the control drive section 24 is controlled by the computer on the basis of the mirror control data, the micro mirror groups 201a, 201b, 201c shown in FIG. 3C are controlled to be in the on-state under control of the control drive section 24. Therefore, the micro mirror groups 201a, 201b, 201c reflect the illumination light rays and direct the light rays to the specimen 11. Thus, the interest region 11a, 11b, 11c are illuminated by the illumination light rays.

Next, there will be described the designating procedure in which a microscope operator determines and designates a predetermined region such as a field of view.

A range of the visual field 111 can be calculated, by the computer 85, from a magnification at which the image 112 of the DMD 20 is projected on the specimen 11, and the micro mirrors 201 to be maintained in the on-state, which corresponds to the calculated range of the visual field, are specified and mirror control data relating to the specified micro mirrors is saved to the memory of the computer.

When the illumination of the visual field is started, the mirror control data are read from the memory by the computer and the control drive section 24 is controlled by the computer on the basis of the mirror control data so that the micro mirrors 201 are controlled by the control drive section 24 to be in the on-state.

In the optical system described above, the micro mirrors 201 of the DMD 20 may be sequentially controlled and the areas 11a, 11b, 11c may be sequentially illuminated, instead of controlling all the micro mirrors 201 in the on state at the same time.

In the DMD 20, each of the micro mirrors 201 is defined as a minimum controlled unit. Thus, controlling the micro mirrors 201 under the limitation of the minimum control unit can designate an arbitrary number of regions 20a, 20b, 20c and can realize required shapes and sizes of the regions 20a, 20b, 20c, respectively. In addition, the DMD 20 can be utilized as a high speed shutter, when all the micro mirrors 201 are off-controlled to stop the illumination light rays, and thereafter, are instantaneously on-controlled to transmit the light rays.

In fluorescence observation, a DMD 20 can be utilized as a field stop, when all the micro mirrors 201 in a field region corresponding to the field are on-controlled and a field region image of the field region is transmitted to the specimen 11. To observe a certain cell cultured in a laboratory dish as the specimen, a region, for example, the region 11a, in which the cell exists, is only illuminated so that the other cells are not affected by the illumination of the predetermined cell, for example, and the other cells are not bleached out by the illumination of the predetermined cell.

In the FRP observation, a predetermined region to be bleached out in the specimen is designated i.e., a shape, size and position of the region is determined, and the DMD 20 is so controlled as to illuminate the predetermined region during a preset period and bleach out a part or parts of the predetermined region. Thereafter, all the micro mirrors 201 in the field of view 111 are on-controlled, a fluorescent image is observed in the field of view, and change of the bleached out part and diffusion of a fluorescence pigment are observed. In this process, it is possible to switch a field illumination state, in which all the region in the field is illuminated, from a partial region illumination state, in which a part of a region is illuminated and the bleaching out of the part region is observed, in a response within a order of tens of micro seconds which corresponds to the response speed of the DMD 20. Thus, a high speed reaction, i.e., a high speed diffusion in the cell can be observed with few time-lag.

In the embodiment described above, the illumination light rays for the bleaching out observation and for the fluorescence image observation may have different wavelengths. The excitation filter 18 or dichroic mirror 13 may be switched with other ones having different wavelength characteristic, by mechanical switching means, to change the wavelength of the illumination light rays, in a microscope system such as a microscope system provided with an electrical movement type filter wheel or electrical movement type cube turret. In the above described embodiment, it is possible to observe the specimen 11 utilizing a caged reagent under the same control of the DMD 20. Furthermore, when a change of fluorescence light rays emitted from a cell is acquired as brightness information using calcium indicators, a region, for example, the region 11b shown in FIG. 3B, corresponding to a cell to be observed is illuminated, and the image of the cell is transmitted and picked up in an optical system in which PMT (not shown) is located so that image data only for a desired part can be measured.

In addition, when a plurality of regions, for example, regions 11a, 11b, 11c, which correspond to a plurality of cells, respectively, are alternatively and sequentially illuminated, the states of the cells can be individually measured with little time-lag.

As described above, in the microscope system according to one embodiment of the invention, illuminating means is located perpendicular to the optical axis and arranged in the conjugate position of the specimen 11, the illuminating means provided with the micro mirrors 201 for illuminating an arbitrary region or regions on the specimen 11, in which illumination light rays are emitted and guided to the micro mirrors 201 through the reflection mirror 21 and the micro mirrors 201 selectively reflect the illumination light rays to the specimen 11 under the on-and off-control.

According to this microscope system in which a reflection optical system is utilized for illumination, the lighting rays are transmitted to specimen 11 from the light source 23 without attenuation. Therefore, the specimen can be illuminated at a high contrast and highly precise color characteristics. In addition, micro mirrors 201 of DMD 20 are individually controlled to turn illumination light rays on and off. Thus, light rays emitted from the light source 23 can be projected on a region having a desired position, size and shape on specimen 11. Furthermore, it is possible to achieve a quick response control and a high precision control of the light rays, and an observation accuracy can be improved. In addition, in this microscope system, no mechanical vibration is generated at the time of controlling the light rays. Thus, precise observation can be realized. In particular, as an observation mode, a useful effect is provided in fluorescence observation.

The invention is not limited to the above described embodiment. According to other embodiments of the invention, a microscope system may be configured as shown in FIG. 4 to FIG. 13. In FIG. 4 to FIG. 13, the same numerals denote the same parts or same components, and a detailed description is omitted.

Figure 4:
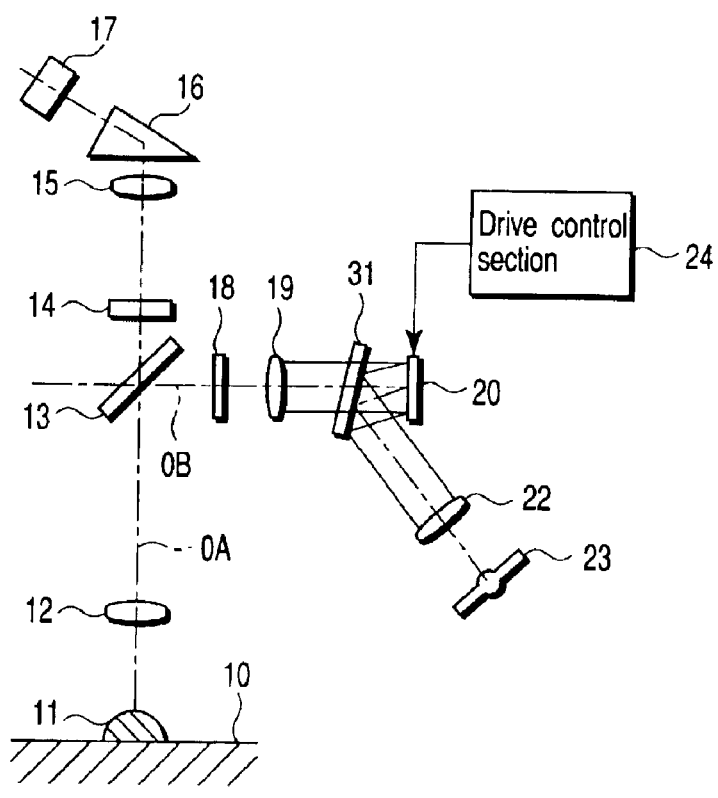
FIG. 4 schematically shows a microscope system according to a second embodiment of this invention.

In a microscope system shown in FIG. 4, a half mirror 31 having 50% reflection and 50% transmission factors, is disposed between the DMD 20 and collector lens 22 as reflecting mirror, light rays emitted from light source 23 are reflected from the half mirror 31 and are incident on the DMD 20, reflected light rays from the DMD 20 passes through the half mirror 31, and is guided to the specimen 11. In this microscope system, the optical path of light rays are bent by the half mirror 31. Therefore, the DMD 20 and an arrangement distance with the field stop and projection lens system 19 can be shortened, and the focal distance of the projection lens system 19 can be freely selected. As a result, the image magnification can be freely determined, at which an image of the DMD 20 is formed on the specimen 11.

FIG. 5 shows a microscope system provided with first and second light sources 41, 42. The DMD 20 has first and second incidence optical axes, and first and second reflecting mirror 45, 46. The first and the second light source 41, 42 are disposed on the first and the second incidence optical axis, respectively. The first collector lens 43 and the first excitation optical filter 47 having a filter characteristic are disposed on the first optical axis between the first reflecting mirror 45 and the first light source 41. The second collector lens 44 and the second excitation optical filter 48 having the characteristic different from a characteristic of the first excitation optical filter 47 are also disposed on the second optical axis between the second reflecting mirror 46 and the second light source 42.

In the optical system shown in FIG. 5, first illumination light rays emitted from the first light source 41 are converged by the first collector lens 43, and a first predetermined component of the first light rays is selectively transmitted through the first excitation optical filter 47, reflected from the first reflecting mirror 45, and guided to the DMD 20. In the DMD 20, the micro mirrors 201, which are in the on-control state, reflects the first illumination light rays along the illumination optical axis OB, and guide the first reflected light rays to the field stop and projection optical system 19. The micro mirrors 201, which are in the off-control state, reflects the first illumination light rays along a first evacuation optical axis OX, and guide the first reflected light rays outside the optical system, and the reflected light rays are not used for illumination.

Second illumination light rays emitted from the second light source 42 are also converged by the second collector lens 44, and a predetermined component of the second light rays is selectively transmitted through the second excitation optical filter 48, is reflected from the second reflecting mirror 46, and is guided to the DMD 20. In the DMD 20, the micro mirrors 201, which are in the on-control state, reflect the second illumination light rays along the illumination optical axis, and guide the second reflected light rays to the field stop and projection optical system 19. The micro mirrors 201, which are in the off-control state, reflect the second illumination OB light rays along a second evacuation optical axis, and guide the second reflected light rays outside the optical system, and the second reflected light rays are not used for illumination.

As shown in FIG. 6, an arbitrary region G in the field of view 111, which corresponds to the micro mirrors 201 being in the on-control state, is illuminated by the first illumination light rays guided from the first light source 41, and the other region H in the field, which corresponds to the micro mirrors 201 in the off control state, is illuminated by the second illumination light rays from the second light source 42.

Thus region G and region H can be illuminated by the first and second light rays having different wavelengths in the optical system in which the first and the second excitation optical filter 47, 48 are band pass filters having transmission characteristics of different wavelength ranges. When a caged fluorescence reagent is used and a specimen is observed in such an optical system, the region G is illuminated by the illumination light rays having a wave length for releasing the caging of a caged reagent, and the region H is illuminated by the illumination light rays having a wave length for causing substances in the specimen to emit fluorescence light rays, after releasing the caging of the caged reagent, and a state of diffusion of the substances, i.e., a substance transfer, in which the releasing of the caging is simultaneously produced, can be observed without a time-lag.

All micro mirrors 201 of DMD 20 and be controlled to turn on and turn off at the same time, and the first and second illumination light rays having different wavelengths and be alternatively switched without vibrations in a high speed of tens micro second. Accordingly, the specimen 11 can be observed in a view observation mode, as if the specimen 11 is simultaneously illuminated by both the first and second light rays. According to the embodiment of the present invention as described above, it is possible to realize various observation modes and improve the usability of the microscope system.

Figure 7:
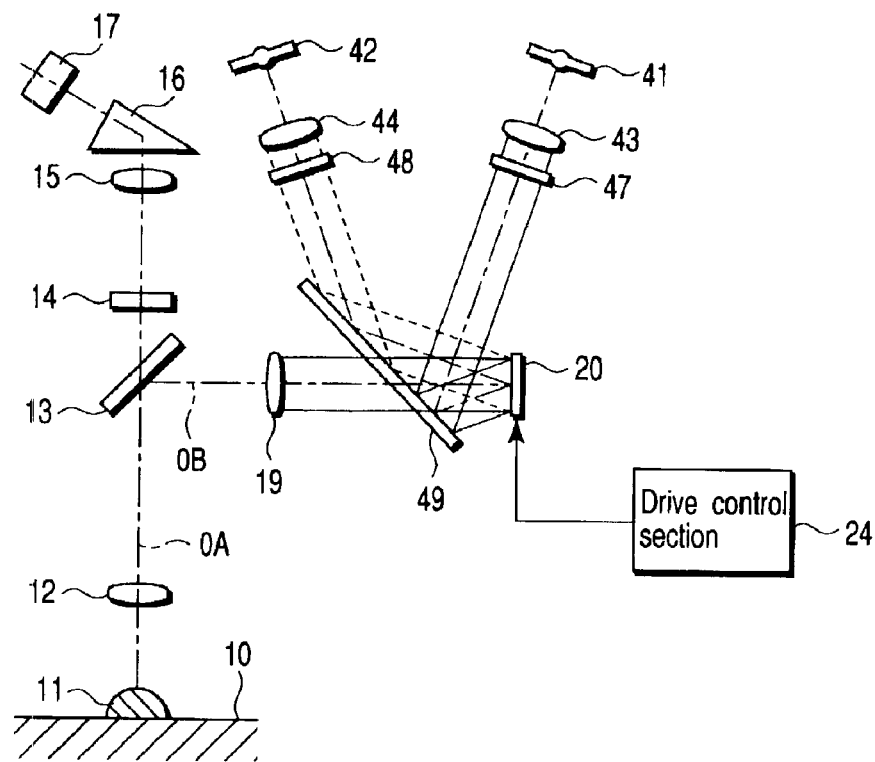
FIG. 7 schematically shows a microscope system according to a fourth embodiment of this invention.

FIG. 7 shows a microscope optical system which is provided with a half mirror 49 instead of the first and the second reflecting mirror 45, 46 shown in FIG. 5. In the microscope system shown in this FIG. 7, an arrangement of the first and second light sources can be changed so as to improve space utilization and enable various designs of the optical system in the microscope system.

Figure 8:
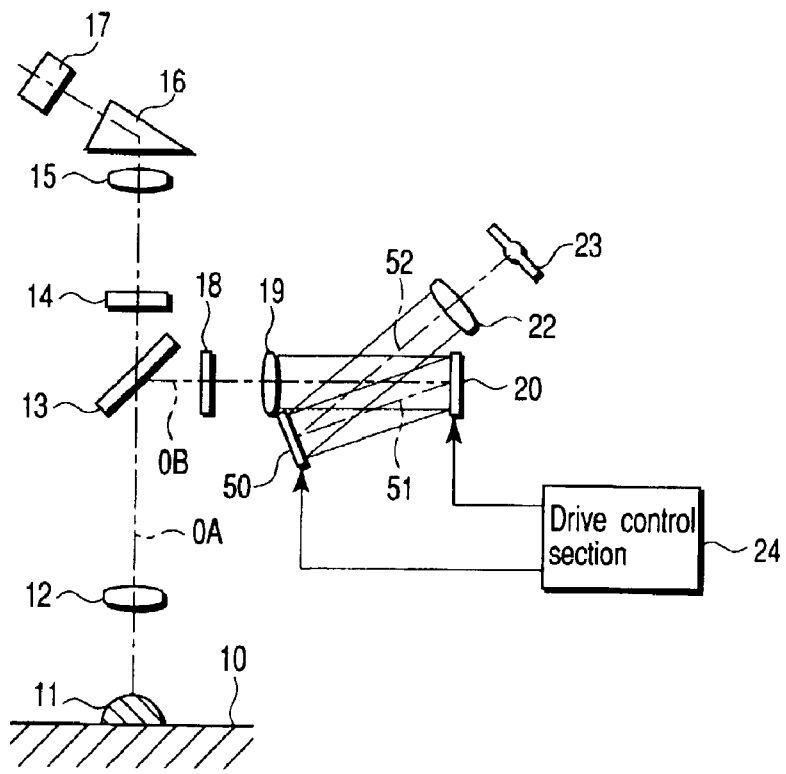
FIG. 8 schematically shows a microscope system according to a fifth embodiment of this invention.

FIG. 8 shows a microscope optical system which is further provided with a second DMD 50 arranged on a conjugate position of an aperture stop and facing the first DMD 20. In the optical system shown in FIG. 8, illumination light rays emitted from the light source 23 are incident on the collector lens 22 and are collimated by the collector lens 22, and the collimated light rays are guided to the second DMD 50. In FIG. 5, numeral 51 denotes the optical axis of the micro mirrors 201 of DMD 20, maintained in the on-control state, and numeral 51 is the optical axis of the micro mirrors 201 of DMD 20, is maintained in the off-control state.

In the configuration shown in FIG. 8, the illumination light rays emitted from the light source 23 are converged by the collector lens 22 and guided to the second DMD 50. When the micro mirrors 201 of DMD 50 are in the on-controlled state, the illumination light ray are reflected by the micro mirrors 201, and guided to DMD 20 along the optical axis 51. When the micro mirrors 201 of this DMD 20 are in an on-controlled state, the illumination light rays are reflected by the micro mirrors 201 and guided along the optical axis OB to the specimen 11, and the specimen 11 are illuminated by the illumination light rays.

In this optical system, the second DMD 50 is arranged in the conjugate position of the aperture stop. Therefore, the reflection pattern can be changed by means of controlling the micro mirrors 201 so that the second DMD 50 acts as arbitrary one of aperture stops having different aperture shapes. According to the second DMD 50, it is possible to achieve an illumination effect which and be generally given and freely set by means of selecting an aperture stop in a microscope. If a region having a predetermined shape, for example, a circular shape is formed, by controlling the micro mirrors 201 to be on, around the optical axis 52 on the second DMD 50, the brightness of the illumination light rays can be adjusted by controlling the size of predetermined shape region. In addition, if the micro mirrors 201 are so controlled as to be in the on-state in a semicircular region on the second DMD 50, which corresponds to one half of the aperture of the aperture stop, an unsymmetrical intensity distribution of the illumination light rays, which is deviated in respect to the optical axis, can be obtained on the specimen 11. According to the embodiment, the function of the aperture stop can be added by the second DMD 50, in addition to the effect of the first DMD 20, too.

Figure 9:
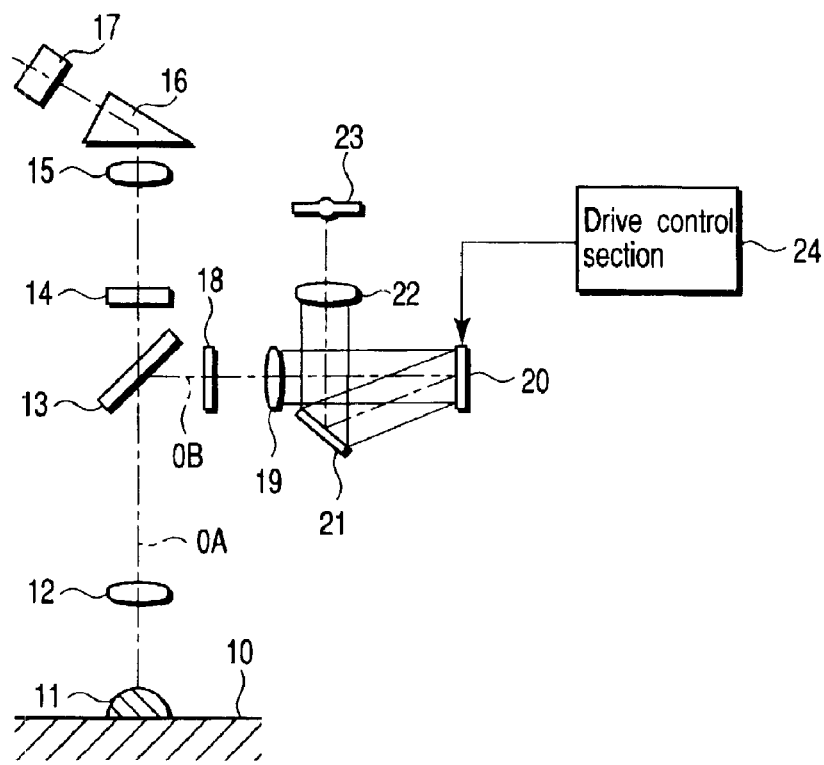
FIG. 9 schematically shows a microscope system according to a sixth embodiment of this invention.
Figure 10:
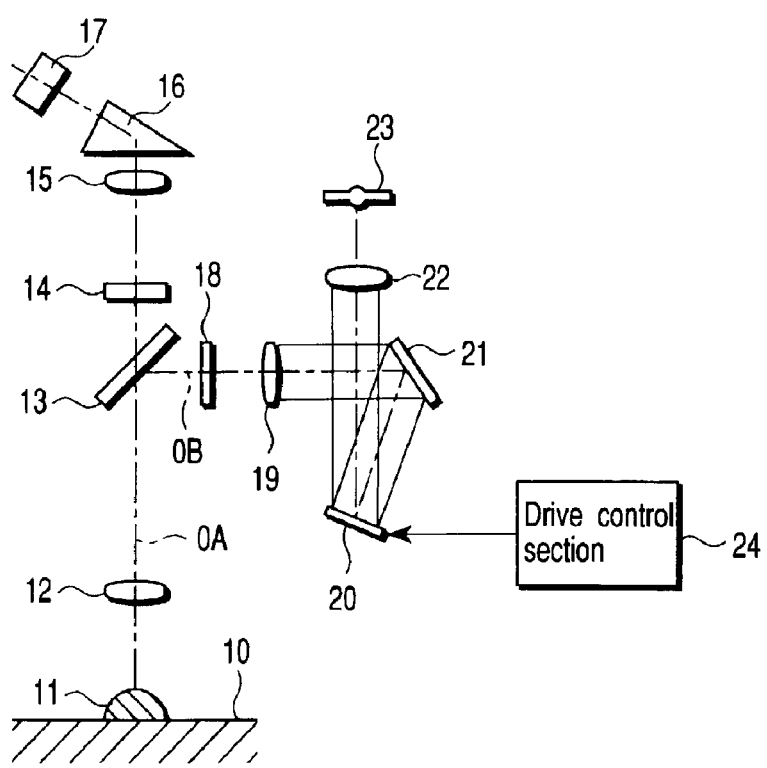
FIG. 10 schematically shows a microscope system according to a seventh embodiment of this invention.

FIG. 9 is a modified embodiment of an optical system shown in FIG. 1, in which the arrangement of the collector lens 22 and the light source 23 are changed. FIG. 10 shows the optical system which is provided with a reflecting mirror 21 for reflecting the illumination light rays from DMD 20, arranged on the optical path between the DMD and the light source. The optical system shown in FIG. 9 and FIG. 10 can minimize the overall size of the microscope.

Figure 11:
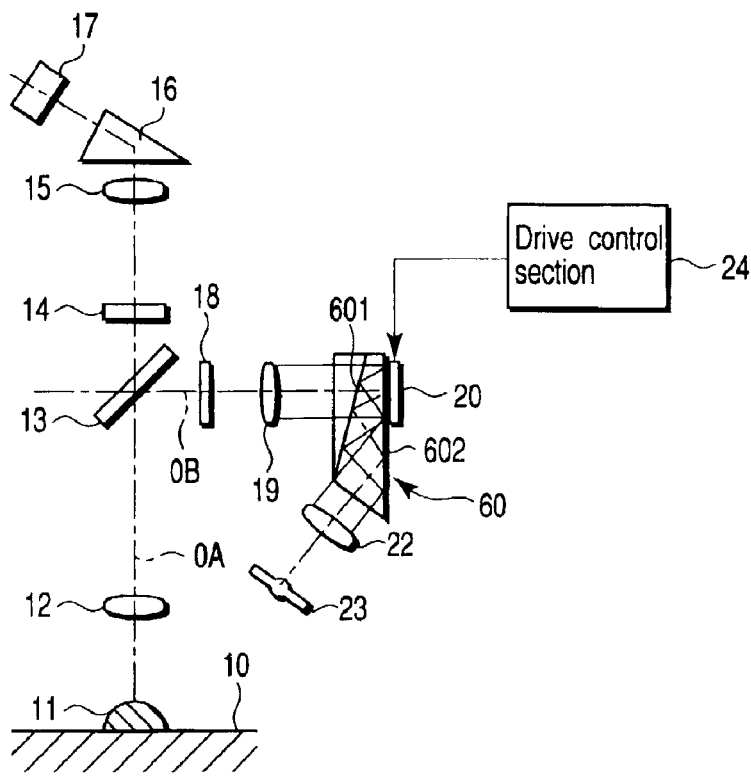
FIG. 11 schematically shows a microscope system according to an eighth embodiment of this invention.

In addition, FIG. 11 shows yet another optical systems, in which a prism 60 having a half mirror coating surface 601 and a total reflection surface 602 is disposed between the collector lens 22 and the field stop and projection optical system 19. In this optical system, the total reflection surface 602 of prism 60 faces to the DMD 20 and the half mirror coating surface 601 of prism 60 faces to the field stop and projection optical system 19. In the optical system shown in this FIG. 11, the illumination light rays from the light source 23 are collimated by the collector lens 22, and the collimated light rays are introduced into the prism 60. In the prism 60, the introduced illumination light rays are reflected between the total reflection surface 602 and the half mirror coating surface 601, and are guided to the DMD 20. The light rays reflected from the micro mirrors 201 of the DMD 20 are directed to the field stop and projection optical system 19. According to the embodiment, the distance between light source 23 and the DMD 20 can be shortened, because the light rays are reflected in the prism 60. Thus, the optical system shown in FIG. 11 can minimize the overall size of the microscope.

Figure 12:
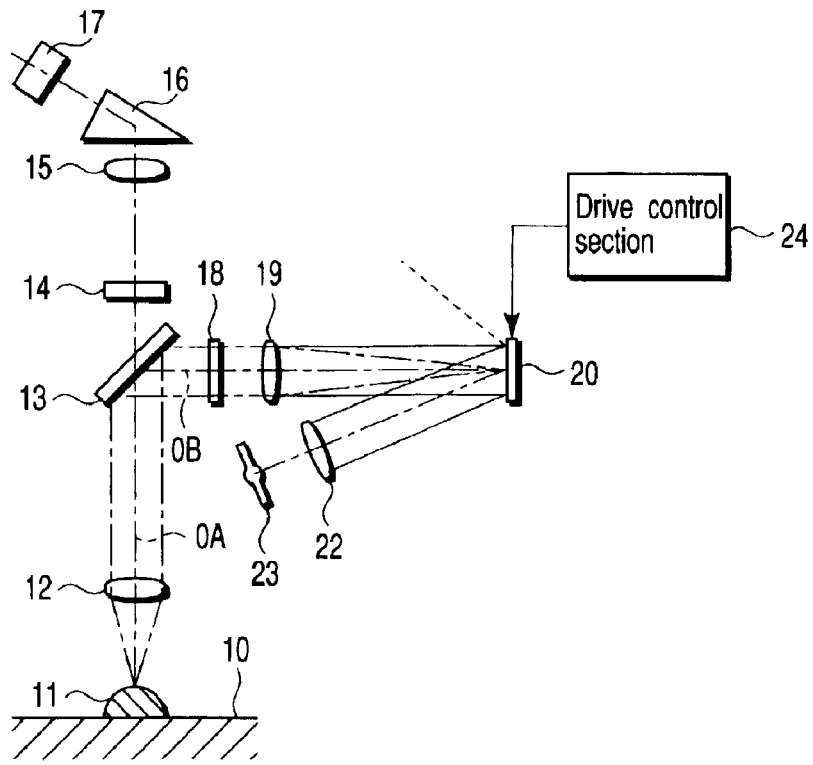
FIG. 12 schematically shows a microscope system according to a ninth embodiment of this invention.

FIG. 12 shows the optical system in which no reflecting mirror 21 is arranged between the DMD 20 and the collector lens 22. In this optical system, the illumination light rays are converged by the collector lens 22 and are directly introduced in the DMD 20. According to this optical system, the number of parts needed can be reduced, thus allowing the microscope to be downsized.

Figure 13:
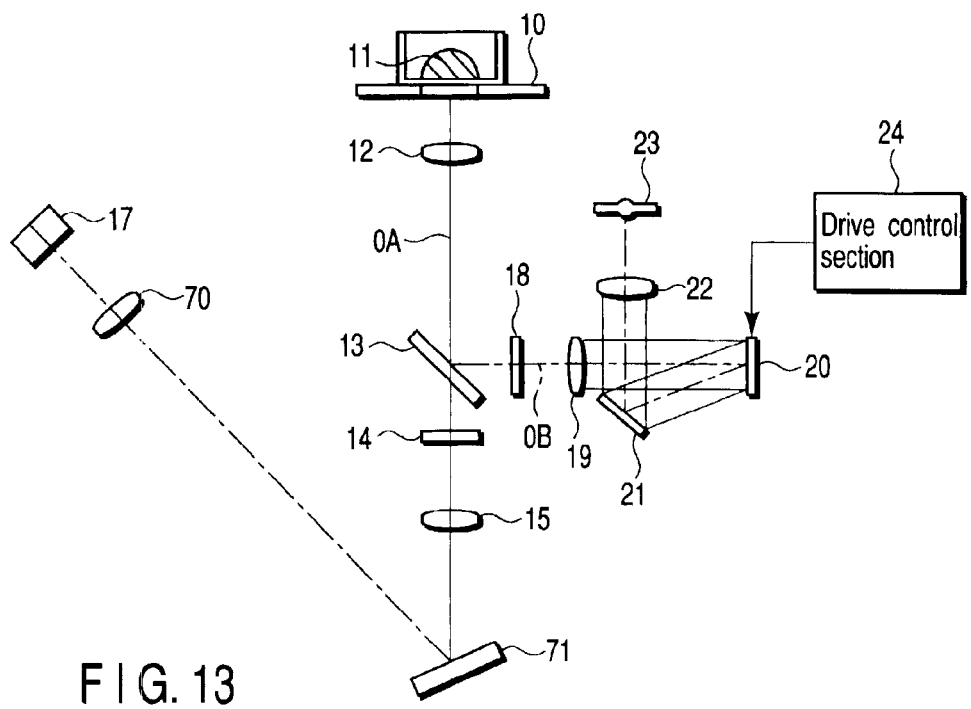
FIG. 13 schematically shows a microscope system according to a tenth embodiment of this invention.

FIG. 13 shows the optical system of an inverted microscope to which the concept of the invention is applied. In the optical system, a relay lens 70 and a total reflection mirror 71 are arranged between the eyepiece lens 17 and the imaging lens 15, instead of the prism 16.

In addition, if, in the above described embodiment, the micro mirrors reflect the illumination light rays along the illumination optical axis, when the micro mirrors of the DMD are in the on-state, and the micro mirrors reflect the illumination light rays along the evacuation optical axis, when the micro mirrors of the DMD are in the on-state. However, this invention is not limited to this operation mode of the DMD. In the DMD, the micro mirrors may reflect the illumination light rays along the evacuation optical axis or illumination optical axis, when the micro mirrors of the DMD are in the on-state.

Furthermore, in this embodiment of the invention, the digital micro mirror apparatus for reflecting the illumination light rays is used, as described above. However, a liquid crystal element of a reflection type may be used instead of a DMD.

In addition, in this embodiment, a white light source such as a mercury lamp, xenon lamp, or halogen lamp is used to illuminate the specimen. However, the light source is not limited to such, and also a laser unit for emitting a laser beam may be used as the light source.

Figure 14:
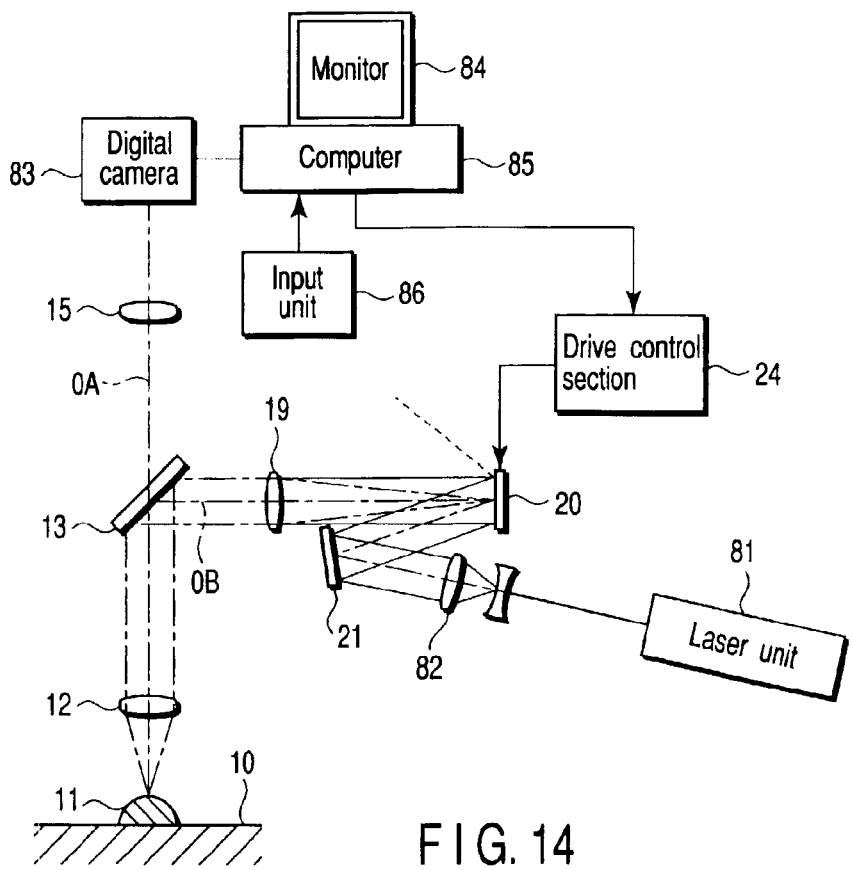
FIG. 14 schematically shows a microscope system according to an eleventh embodiment of this invention.

The optical system shown in FIG. 14 has the same basic configuration as that of the previously described embodiment. This, a detailed description will be omitted about the configuration of FIG. 14. The microscope shown in FIG. 14 is different of the above described embodiment, as follows. A beam expander 82 such as a convexo-concave lens system is arranged on the optical axis of the laser beam emitted from laser light unit 81 to expand the laser beam and guide the expanded laser beam. The microscope shown in FIG. 14 is provided with a digital camera 83 for picking up a fluorescence image of a specimen activated with the laser beam, a computer 85 for processing the image data supplied from the digital camera an input unit 86 for the computer 85, and a monitor 84 for displaying an image of the specimen based on the processed image data. When a laser unit is used as a light source, the wavelength of the light source is limited, but a bright illumination can be realized in compared with the white light source.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A microscope system for observing a specimen, comprising:
    an objective lens facing the specimen;
    an illuminating unit configured to emit illumination light rays;
    a first optical element array including a plurality of first micro deflection elements, each configured to deflect the illumination light rays emitted from the illumination unit and to selectively direct the illumination light rays in one of first and second directions, the optical element array being located at a first conjugate position with respect to the specimen;
    a second optical element array including a plurality of second micro deflection elements, each configured to deflect the illumination light rays emitted from the illumination unit and to selectively direct the illumination light rays to the first optical element array, the second optical element array being located at one of an aperture stop position and a second conjugate position with respect to the aperture stop position;
    a control section configured to control the first and second micro deflection elements, individually, to form a pattern of the illumination light rays directed to the first direction; and
    a transfer optical system configured to transfer the pattern of the illumination liqht rays to the specimen through the lens.

2. The microscope system according to claim 1, wherein the first and second micro deflection elements of he first and second optical element arrays comprise respective reflecting surfaces, and each reflecting surface is tilted and selectively reflects the illumination light rays in the one of the first and second directions.

3. The microscope system according to claim 1, further comprising:
    a collection lens which is arranged between the illumination unit and the second optical element array, and which is configured to collimate the illumination light rays emitted from the illumination unit and to project the collimated light rays on the second optical element array.

4. The microscope system according to claim 1, further comprising:
    a mirror which is arranged in an optical path between the specimen and the first optical element array, and which is configured to reflect the light rays from the first optical element array to the specimen.

* * * * *